(12) United States Patent
Lee

(10) Patent No.: US 7,509,751 B2
(45) Date of Patent: Mar. 31, 2009

(54) DEVICE FOR MEASURING DEPTH FOR USE WITH DIAL HEIGHT GAUGE

(76) Inventor: Bong Ae Lee, 456-2, Majang-dong, Seongdong-gu, Seoul, 133-812 (KR)

( * ) Notice: Subject to any disclaimer, the term of this patent is extended or adjusted under 35 U.S.C. 154(b) by 29 days.

(21) Appl. No.: 11/842,282

(22) Filed: Aug. 21, 2007

(65) Prior Publication Data

US 2008/0047156 A1   Feb. 28, 2008

(30) Foreign Application Priority Data

Aug. 22, 2006   (KR) ...................... 20-2006-0022407

(51) Int. Cl.
   *G01B 3/00*   (2006.01)
(52) U.S. Cl. ..................... 33/542; 33/836; 248/222.14
(58) Field of Classification Search .................. 33/542, 33/544.4, 544.5, 542.1, 555, 836, 832, 833, 33/572, 642; 248/222.14, 224.7, 295.11
   See application file for complete search history.

(56) References Cited

U.S. PATENT DOCUMENTS

| | | | | |
|---|---|---|---|---|
| 2,177,399 A | * | 10/1939 | Aller | 33/556 |
| 2,472,431 A | * | 6/1949 | Marcil | 33/556 |
| 2,506,924 A | * | 5/1950 | Huber | 33/572 |
| 2,588,131 A | * | 3/1952 | Lester | 33/838 |
| 2,882,606 A | * | 4/1959 | Hitchcock | 33/32.2 |
| 4,530,158 A | * | 7/1985 | Chauquet | 33/556 |
| 4,896,857 A | * | 1/1990 | McCullough | 248/279.1 |
| 5,996,946 A | * | 12/1999 | Bailey | 248/125.1 |
| 6,334,594 B1 | * | 1/2002 | Bailey | 248/125.1 |

* cited by examiner

*Primary Examiner*—G. Bradley Bennett
*Assistant Examiner*—Amy Cohen Johnson
(74) *Attorney, Agent, or Firm*—Ladas & Parry LLP

(57) ABSTRACT

Provided is a device for measuring depth of an elongate deep groove or hole in a small-size mold for use with a dial height gauge. The depth measuring device includes: a fixing portion; an upper head type touch pin; and a hammer-shaped main body having a first vertical hole through which the fixing portion is fitted and a second vertical hole through which the touch pin and the hollow cylindrical column are fitted. The depth measuring device can be conveniently assembled and disassembled, to thus enable a user to easily replace a damaged touch pin with a new one. Touch pins of various size that are fit for depth and width of grooves can be purchased at low cost. The depth measuring device enables a user to measure a desired physical quantity up to a 0.01 mm error range in accuracy as well as greatly contribute for a precision industry development. The depth measuring device provides an effect of greatly reducing labor power and cost for manufacturing molds.

3 Claims, 3 Drawing Sheets

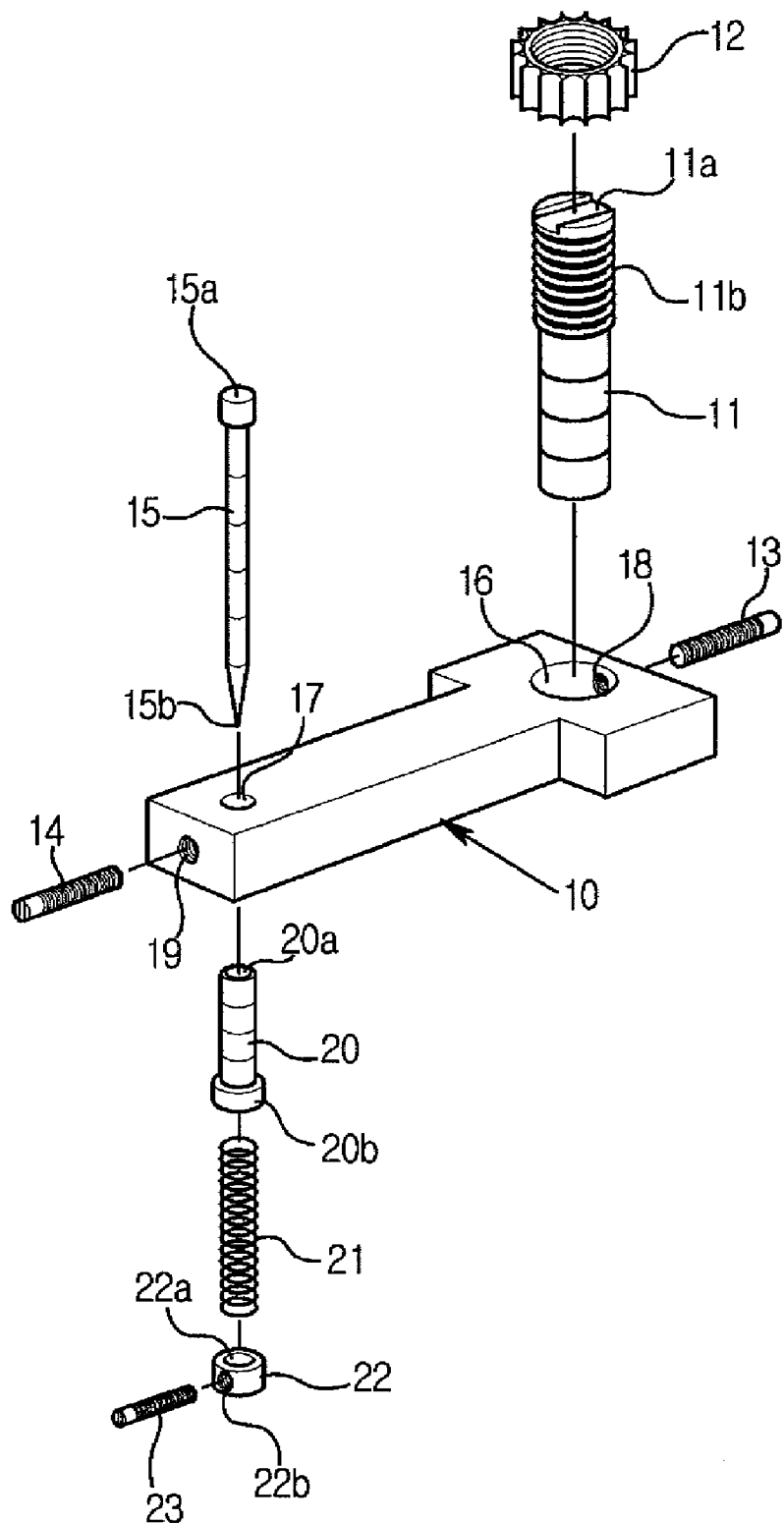
[FIG. 1]

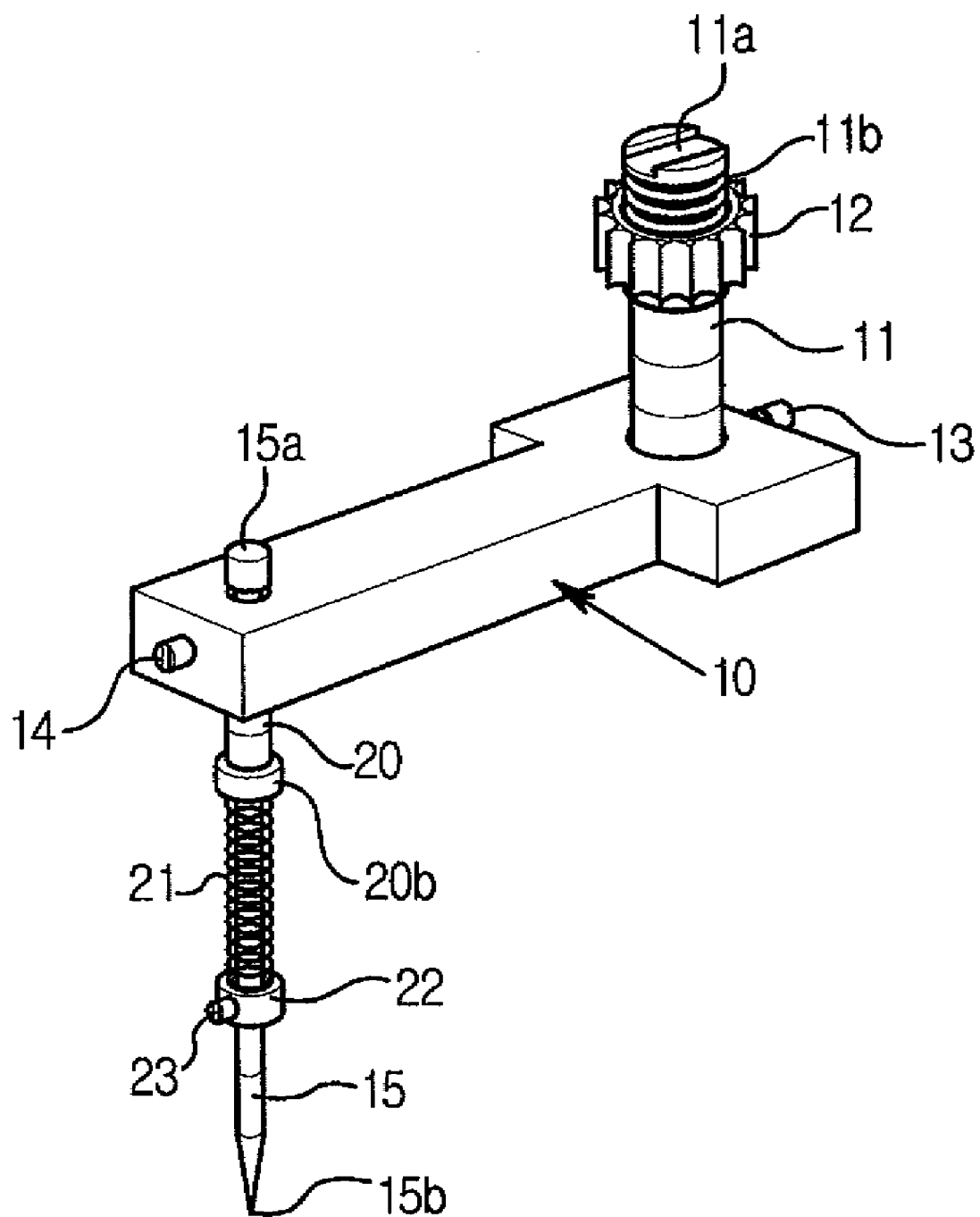
[FIG. 2]

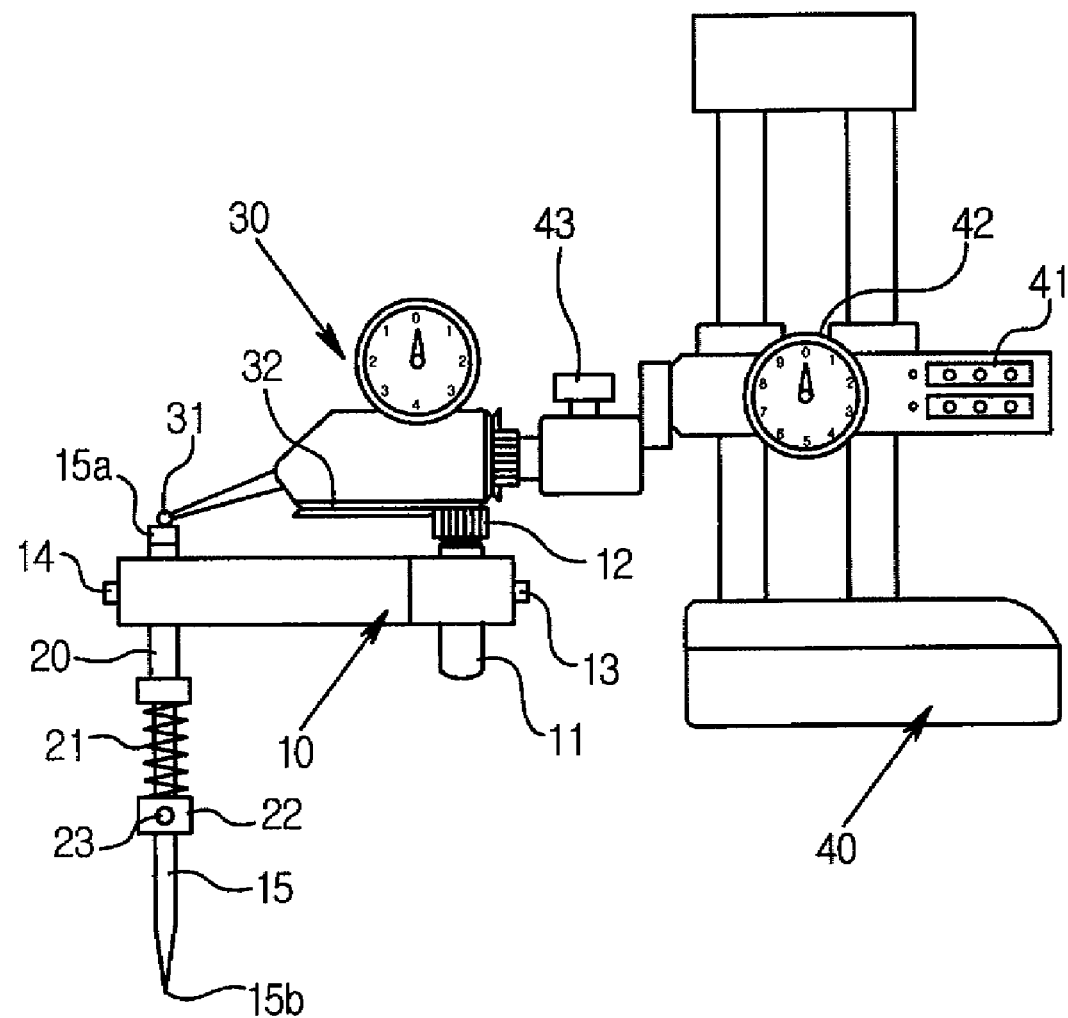
[FIG. 3]

DEVICE FOR MEASURING DEPTH FOR USE WITH DIAL HEIGHT GAUGE

CROSS-REFERENCE TO RELATED PATENT APPLICATION

This application claims the benefit of Korean Utility-model Application No. 20-2006-0022407, filed on Aug. 22, 2006, in the Korean Intellectual Property Office, the disclosure of which is incorporated herein in its entirety by reference.

BACKGROUND OF THE INVENTION

1. Field of the Invention

The present invention relates to a device for measuring depth of an elongate groove of a precise and compact up-to-date component for use with a dial height gauge, and more particularly, to a device measuring depth for use with a dial height gauge, in which an elongate pin combined with a spring is installed on a dial height gauge so as to be conveniently used.

2. Description of the Related Art

A conventional auxiliary device for measuring depth of a groove is a pair of dial or digital calipers (namely, a pair of vernier calipers) for measuring depth but is not effective to measure an elongate deep groove or hole. Accordingly, it is a recent trend that companies using a three-dimensional measuring instrument of several tens of thousand U.S. dollars or a desktop depth dial measuring instrument are increasing. However, the three-dimensional measuring instrument or the desktop depth dial measuring instrument is not so easy to move. As a result, since a pair of vernier calipers are inexpensive and convenient to be used and easy to movably measure a desired physical quantity, they cannot help being used on a manufacturing site. Therefore, depth is measured with a pair of vernier calipers but a measurement error is so big. Thus, the vernier calipers are improper to measure small-size accurate parts or molds.

SUMMARY OF THE INVENTION

To solve the above problems of the conventional art, it is an object of the present invention to provide a device for measuring depth for use with a dial height gauge in which the depth measuring device is installed in the dial height gauge in addition to a dial indicator installed in the dial height gauge, to thereby conveniently measure an elongate deep groove.

To accomplish the above object of the present invention, there is provided a device for measuring depth of an elongate deep groove or hole in a small-size mold for use with a dial height gauge, the depth measuring device comprising:

a fixing portion formed of a cylindrical column on the upper portion of which threads are formed, and on the upper surface of which a fitting groove of a predetermined shape is formed to be fitted into a fitting protrusion which is formed in the lower end surface of a dial indicator, in which a roulette-type nut is fitted and tightened with the threads formed on the upper portion of the cylindrical column and the cylindrical column is fixed by a first screw bolt;

an upper head type touch pin which is fitted into a lower head type hollow cylindrical column, a coiled spring, and a compression ring having a third fixing screw hole, in which the coiled spring is positioned between the head of the hollow cylindrical column and the compression ring, the hollow cylindrical column is fixed by a second screw bolt the touch pin is fixed by a third screw bolt fitted into the third fixing screw hole; and a hammer-shaped main body having a first vertical hole through which the fixing portion is fitted and a first fixing screw hole through which the first screw bolt is fitted and which is formed on the side surface of the main body, at the head portion of the hammer-shaped main body, and having a second vertical hole through which the touch pin and the hollow cylindrical column are fitted and a second fixing screw hole through which the second screw bolt is fitted and which is formed on the side surface of the main body, at the grip portion of the hammer-shaped ma in body.

Here, the touch pin reciprocates in the hollow cylindrical column fixed to the main body. The spring plays a role of making the touch pin touch an object to be measured on a spring sensitive touch basis. The touch pin is fitted through the coiled spring. The touch pin is fixed by the third screw bolt fitted into the third fixing screw hole formed on the compression ring. The upper head of the touch pin makes the touch pin supported by the hollow cylindrical column to thus prevent the touch pin from seceding into the hollow cylindrical column. The lower head of the hollow cylindrical column makes the spring compressed against the compression ring, to thus prevent the spring from being pushed up and thus make the spring compressed between the lower head of the hollow cylindrical column and the compression ring. The lower end of the touch pin is formed like an auger so as to measure a narrow groove.

BRIEF DESCRIPTION OF THE DRAWINGS

The above and other objects and advantages of the present invention will become more apparent by describing the preferred embodiment thereof in more detail with reference to the accompanying drawings in which:

FIG. 1 is an exploded perspective view showing the whole structure of a device for measuring depth for use with a dial height gauge, according to the present invention;

FIG. 2 is an assembled perspective view of FIG. 1; and

FIG. 3 is a side elevation view showing the state where the whole structure of a device for measuring depth is installed in a dial height gauge, according to the present invention.

DETAILED DESCRIPTION OF THE INVENTION

The structure and function of a device for measuring depth for use with a dial height gauge according to the present invention will be described in detail below with reference to the accompanying drawings.

The whole structure of a device for measuring depth for use with a dial height gauge, according to the present invention is shown in FIG. 1. In FIG. 2, the device for measuring depth for use with a dial height gauge, according to the present invention is assembled. The state where the whole structure of a device for measuring depth is installed in a dial height gauge, according to the present invention is shown in FIG. 3.

As illustrated in FIGS. 1 to 3, a device for measuring depth of an elongate deep groove or hole in a small-size mold can be used with a dial height gauge. The depth measuring device can be installed in the dial height gauge.

The depth measuring device includes a fixing portion formed of a cylindrical column 11 on the upper portion of which threads 11b are formed, and on the upper surface of which a fitting groove 11a of a predetermined shape is formed to be fitted into a fitting protrusion 32 which is formed in the lower end surface of a dial indicator 30, in which a roulette-type nut 12 is fitted and tightened with the threads 11b formed on the upper portion of the cylindrical column 11 and the cylindrical column 11 is fixed by a first screw bolt 13. Here, the fitting groove ha formed on the upper surface of the cylindrical column 11 may be formed into a proper shape in order to prevent the depth measuring device from being seceded from the dial height gauge. For example, it is preferably a Δ-shaped form.

The depth measuring device also includes an upper head type touch pin 15 which is fitted into a lower head type hollow cylindrical column 20, a coiled spring 21, and a compression ring 22 having a third fixing screw hole 22b, in which the coiled spring 21 is positioned between the head of the hollow cylindrical column 20 and the compression ring 22, the hollow cylindrical column 20 is fixed by a second screw bolt 14 which is fitted into a second screw fixing hole 19, the touch pin 15 is fixed by a third screw bolt 23 fitted into the third fixing screw hole 22b.

The depth measuring device also includes a hammer-shaped main body 10 having a first vertical hole 16 through which the fixing portion is fitted and a first fixing screw hole 16 through which the first screw bolt 13 is fitted and which is formed on the side surface of the main body 10, at the head portion of the hammer-shaped main body 10, and having a second vertical hole 17 through which the touch pin 15 and the hollow cylindrical column 20 are fitted and a second fixing screw hole 19 through which the second screw bolt 14 is fitted and which is formed on the side surface of the main body 10, at the grip portion of the hammer-shaped main body 10.

Here, the screw bolts are anti-loose mood bolts which are fitted and tightened into the fixing screw holes, respectively, to thereby make the fixing portion, the hollow cylindrical column, and the touch pin, fixed firmly.

Meanwhile, the touch pin 15 combined with the spring 21 reciprocates vertically, in cooperation with the hollow cylindrical column 20. That is, the touch pin 15 reciprocates in the hollow cylindrical column 20 fixed to the main body 10.

The spring 21 plays a role of making the touch pin 15 touch an object to be measured on a spring sensitive touch basis. The touch pin 15 is fitted through the coiled spring 21. The touch pin 15 is fixed by the third screw bolt 23 fitted into the third fixing screw hole 22b formed on the compression ring 22. The upper head 15a of the touch pin 15 makes the touch pin 15 supported by the hollow cylindrical column 20 to thus prevent the touch pin 15 from seceding into the hollow cylindrical column 20. The lower head of the hollow cylindrical column 20 makes the spring 21 compressed against the compression ring 22, to thus prevent the spring 21 from being pushed up and thus make the spring 21 compressed between the lower head of the hollow cylindrical column 20 and the compression ring 22. The lower end 15b of the touch pin 15 is formed like an auger so as to measure a narrow groove. The lower end 15b of the touch pin 15 passes through the hole 20a of the hollow cylindrical column 20 and the hole 22a of the compression ring 22.

The function and effect of the dial height gauge depth measuring device having the above-described structure according to the present invention will follow.

A process of assembling the fixing portion and the touch pin on the main body for use with the dial height gauge will be described below.

First, a hollow cylindrical column 20 with a head 20b is inserted into a vertical hole 19 with the head 20b directed downwards, so as to be protruded and exposed over the surface of a main body 10. Then, a screw bolt 14 is fitted and tightened into a fixing screw hole 19. Then, a touch pin 15 is fitted into the hollow cylindrical column 20 with the lower end 15b of the touch pin 15 directed downwards and the lower end 15b of the touch pin 15 is fitted into a coiled spring 21. That is, the spring 21 is pushed up to make the lower end 15b of the touch pin 15 pass through the spring 21. Then, a compression ring 22 is pushed up to make the lower end 15b of the touch pin 15 pass through the compression ring 22. Then, a screw bolt 23 is fitted and tightened into a screw fixing hole 22b to fix the touch pin 15, at the state where the spring 21 is slightly compressed.

Next, a cylindrical column 11 is fitted into a hole 16 formed in the main body 10 so that threads 11b formed on the cylindrical column 11 are not buried into the hole 16. Then, a screw bolt 13 is fitted and tightened into a screw fixing hole 18. Then, a roulette type nut 12 is fitted with the threads 11b. The roulette type nut 12 is turned left or right to go down until a groove 11a is positioned over the nut 12 (see FIG. 2). Here, the fitting groove ha formed on the upper surface of the cylindrical column 11 may be formed into a proper shape in order to prevent the depth measuring device from being seceded from the dial height gauge. For example, it is preferably a Δ-shaped form.

The depth measuring device as assembled above is installed in connection with a dial height gauge, as shown in FIG. 3.

First, the fitting groove 11a formed on the upper surface of the cylindrical column 11 is fitted into a fitting protrusion 32 formed at the lower side of a dial indicator 30. Then, a touch ball 31 is positioned at a slight distance from the center of the head 15a of the touch pin 15 and then the nut 12 is turned right or left to be fixed. Here, the dial indicator 30 is combined with a dial height gauge 42 having a measuring instrument 41, via a dial indicator fixing bolt 43. Here, the dial height gauge 42 is supported on a stand 40.

On the following, a method of using the depth measuring device which is combined with the dial height gauge 42 together with the dial indicator 30 will be described.

First, the dial height gauge 40 combined with the depth measuring device is put on an object to be measured. Then, the lower end of the touch pin 15 is slightly touched on the surface of the object. Simultaneously, the indicator on a figure plate of the dial indicator 30 is slightly moved and then set to be zero. The indicator on a figure plate of the dial height gauge 42 is also set to be zero. The three figures on the measuring instrument 41 are also set to be zeros. If the three figures on the measuring instrument 41 are all set to be zeros, the lower end of the touch pin 15 is touched to the surface of the bottom of the object to be measured, and simultaneously the indicator on the figure plate of the dial indicator 30 is stayed to a figure "0." Then, the measured values of the measuring instrument 41 and the measured values appearing on the dial height gauge 42 are calculated up to an error range of 0.01 mm.

As described above, according to the effects provided by the device for measuring depth of an elongate deep groove or hole according to the present invention, the depth measuring device can be conveniently assembled and disassembled, to thus enable a user to easily replace a damaged touch pin with a new one. Touch pins of various size that are fit for depth and width of grooves can be purchased at low cost. The depth measuring device enables a user to measure a desired physical quantity up to a 0.01 mm error range in accuracy as well as greatly contribute for a precision industry development. The depth measuring device provides an effect of greatly reducing labor power and cost for manufacturing molds.

As described above, the present invention has been described with respect to particularly preferred embodiments. However, the present invention is not limited to the above embodiments, and it is possible for one who has an ordinary skill in the art to make various modifications and variations, without departing off the spirit of the present invention.

What is claimed is:

1. A device for measuring depth of an elongate deep groove or hole in a small-size mold for use with a dial height gauge, the depth measuring device comprising:

a fixing portion formed of a cylindrical column on the upper portion of which threads are formed, and on the upper surface of which a fitting groove of a predetermined shape is formed to be fitted into a fitting protrusion which is formed in the lower end surface of a dial indicator, in which a roulette-type nut is fitted and tightened with the threads formed on the upper portion of the cylindrical column and the cylindrical column is fixed by a first screw bolt;

an upper head type touch pin which is fitted into a lower head type hollow cylindrical column, a coiled spring, and a compression ring having a third fixing screw hole, in which the coiled spring is positioned between the head of the hollow cylindrical column and the compression ring, the hollow cylindrical column is fixed by a second screw bolt, the touch pin is fixed by a third screw bolt fitted into the third fixing screw hole; and a hammer-shaped main body having a first vertical hole through which the fixing portion is fitted and a first fixing screw hole through which the first screw bolt is fitted and which is formed on the side surface of the main body, at the head portion of the hammer-shaped main body, and having a second vertical hole through which the touch pin and the hollow cylindrical column are fitted and a second fixing screw hole through which the second screw bolt is fitted and which is formed on the side surface of the main body, at the grip portion of the hammer-shaped main body.

2. The depth measuring device according to claim 1, wherein the touch pin reciprocates in the hollow cylindrical column fixed to the main body.

3. The depth measuring device according to claim 1, wherein the lower end of the touch pin is formed like an auger so as to measure a narrow groove.

* * * * *